(12) United States Patent
Nerin et al.

(10) Patent No.: US 7,768,691 B2
(45) Date of Patent: Aug. 3, 2010

(54) DEVICE FOR GENERATING POLYCHROMATIC LIGHT WITH A CONTINUOUS SPECTRUM

(75) Inventors: Philippe Nerin, Nages et Solorgues (FR); Pierre-Alain Champert, Langoat (FR); Sébastien Fevrier, Limoges (FR); Philippe Roy, Limoges (FR); Vincent Couderc, Verneuil sur Vienne (FR); Philippe Leproux, Limoges (FR); Ludovic Grossard, Limoges (FR)

(73) Assignees: Horiba ABX SAS, Montpellier (FR); Universite de Limoges, Limoges (FR); Centre National de la Recherche Scientifique CNRS, Paris (FR)

( * ) Notice: Subject to any disclaimer, the term of this patent is extended or adjusted under 35 U.S.C. 154(b) by 388 days.

(21) Appl. No.: 10/592,467

(22) PCT Filed: Mar. 8, 2005

(86) PCT No.: PCT/FR2005/000550

§ 371 (c)(1),
(2), (4) Date: Jan. 9, 2007

(87) PCT Pub. No.: WO2005/098527

PCT Pub. Date: Oct. 20, 2005

(65) Prior Publication Data

US 2007/0216989 A1    Sep. 20, 2007

(30) Foreign Application Priority Data

Mar. 12, 2004  (FR) ................................. 04 02589

(51) Int. Cl.
*G02F 2/02* (2006.01)
*H01S 3/10* (2006.01)

(52) U.S. Cl. .............................. 359/326; 372/6; 372/23; 385/122

(58) Field of Classification Search ......... 359/326–332; 372/6, 21, 23; 385/122
See application file for complete search history.

(56) References Cited

U.S. PATENT DOCUMENTS

| 7,280,567 B2 * | 10/2007 | Luo et al. ................. 372/6 |
| 2006/0013270 A1 * | 1/2006 | Yumoto et al. ............. 372/21 |
| 2008/0226242 A1 | 9/2008 | Buchter et al. |

FOREIGN PATENT DOCUMENTS

| JP | 11 119269 | 4/1999 |
| JP | 11119269 A * | 4/1999 |

OTHER PUBLICATIONS

Husakou A. V. et al.,"Supercontinuum Generation of Higher-Order Solitons by Fission in Photonic Crystal Fibers", Physical Review Letter, vol. 87, No. 20, pp. 203901-1-203901-4. Nov. 12, 2001.
Ilev I. et al., "Highly efficient wideband continuum generation in a single-mode optical fiber by powerful broadband laser pumping", Applied Optics, Optical Society of America, vol. 35, No. 15, pp. 2548-2553, May 20, 1996.
Lehtonen M.et al.,"Supercontinuum generation in a higly birefringent microstructured fiber" Applied Physics Letters, American Institute of Physics., vol. 82, No. 14, pp. 2197-2199, Apr. 7, 2003.

* cited by examiner

*Primary Examiner*—Hemang Sanghavi
(74) *Attorney, Agent, or Firm*—Oblon, Spivak, McClelland, Maier & Neustadt, L.L.P.

(57) ABSTRACT

A dedicated polychromatic light generating device including optical pumping devices used to deliver radiation with at least two different excitation wavelengths and a light-guiding device used to deliver polychromatic light at an output when excited by the radiation in a non-linear interaction regime.

18 Claims, 2 Drawing Sheets

DEVICE FOR GENERATING POLYCHROMATIC LIGHT WITH A CONTINUOUS SPECTRUM

Figure 1:
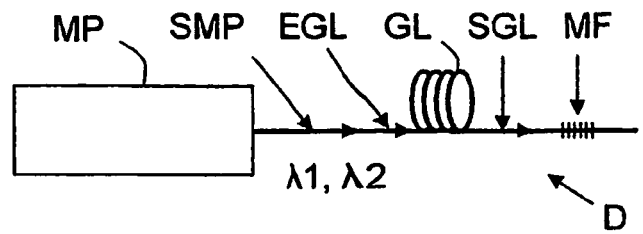

The invention relates to the field of light sources, and particularly sources of white light.

As is known in the art, broad spectrum white light can be generated by various methods.

A first method is to use a source which directly emits a broad spectrum white light, for example an incandescent lamp, a quartz lamp or a xenon arc. In this case the emission spectrum is substantially continuous but the luminance delivered is fairly weak and the light emission is isotropic, thus making it impossible both to focus on very small areas and to form a spatially coherent beam (or a beam with low divergence). In addition, light sources of this kind are of a considerable size. Moreover the life of these sources is relatively short. Furthermore, arc or incandescent sources generate a great deal of heat and therefore have a poor yield.

A second method comprises placing a large number of monofrequency laser diodes in parallel emitting photons of different wavelengths. In this case the dimensions are relatively slight but the spectrum supplied is not continuous, the power supplied is fairly low, the partition noise is fairly high and there may be variations in intensity between diodes.

A third method consists in pumping a microstructured optical fibre with a monofrequency laser such as for example a solid laser, e.g. a titanium/sapphire laser, operating in a pulsed regime with impulses of the order of a picosecond to a femtosecond for repetition rates ranging from kilohertz to megahertz. Such pumping induces non-linear effects in the microstructured fibre which make it possible to generate photons with different wavelengths. This type of source is described in particular in the document by J K Ranka et al, Optics Letters, vol. 25, No 1, p. 25-27, 2000 and in the document by J C Knight et al, Optics Letters, vol. 26, No 17, p. 1356-1358, 2001. Because of the type of laser used a light source of this kind is very expensive and additionally very bulky, thus ruling out its use in an integrated product.

As there is no known source which is totally satisfactory the invention sets out to improve the situation.

To this end it proposes a device for generating polychromatic light comprising, on the one hand, optical pumping means which are used to deliver radiation with at least two different excitation wavelengths, preferably two groups of different wavelengths, and on the other hand light-guiding means arranged to deliver polychromatic light at an output when excited by the radiation in a non-linear light/matter interaction regime.

The device according to the invention may take numerous forms, at least some of the features of which may be combined with one another, specifically:

its light-guiding means may have a dispersion profile comprising at least one cut-off associated with one or more selected wavelengths, and its optical pumping means may be designed so as to deliver radiation at excitation wavelengths which are above and below said selected wavelength, and optionally distributed on either side thereof, its light-guiding means are preferably monomodal, such that the polychromatic light is preferably transverse monomodal, its optical pumping means may be used to deliver radiation in a pulsed and time-synchronised or virtually continuous or continuous manner, its optical pumping means may comprise a laser source which delivers radiation at the different excitation wavelengths. In this case the laser source may for example comprise a laser delivering a first excitation wavelength and supplying frequency conversion means which deliver the radiation in at least one second excitation wavelength. These frequency conversion means may for example be produced in the form of one or more frequency doublers, optionally of the non-linear crystal type, the second excitation wavelength thus being twice as small as the first. In an alternative embodiment the frequency conversion means may, for example, be made in the form of at least one frequency tripler, the second and third excitation wavelengths then being respectively two and three times smaller than the first excitation wavelength. In another alternative embodiment the laser source may comprise a parametric oscillator which delivers the radiation at the different excitation wavelengths, its light-guiding means may comprise a light guide, e.g. installed in an integrated circuit, its light-guiding means may comprise an optical fibre of judiciously selected dimensions. In this case the optical fibre may be a microstructured fibre such as for example a perforated fibre or a photonic fibre, its light-guiding means may be of the type known as "polarisation-selecting" or "polarisation-maintaining", it may comprise filtering means used to filter (or select) certain wavelengths downstream of the light-guiding means. Filtering means of this kind may for example comprise one or more Bragg gratings, it may comprise coupling means used to couple the optical pumping means to the input of the light-guiding means.

The invention may be used in a large number of fields, especially for the metrology of physical magnitudes, optical microscopy and particularly tomographic imaging and three-dimensional microscopy, spectroscopy, medical analysis of samples and in particular flow cytometry, medical holography, the transmission of images, particularly holographic images, the manipulation of particles or atoms of microscopic and sub-microscopic dimensions, and interferometry.

Figure 2:
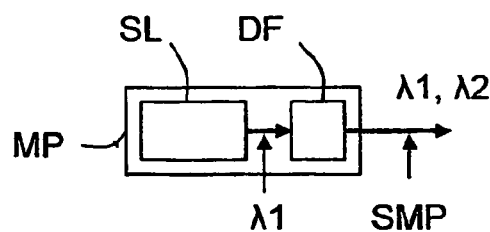
Figure 3:
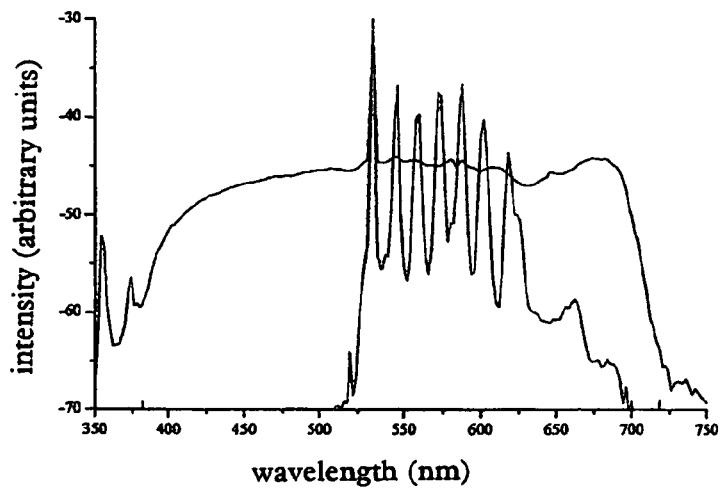
Figure 4:
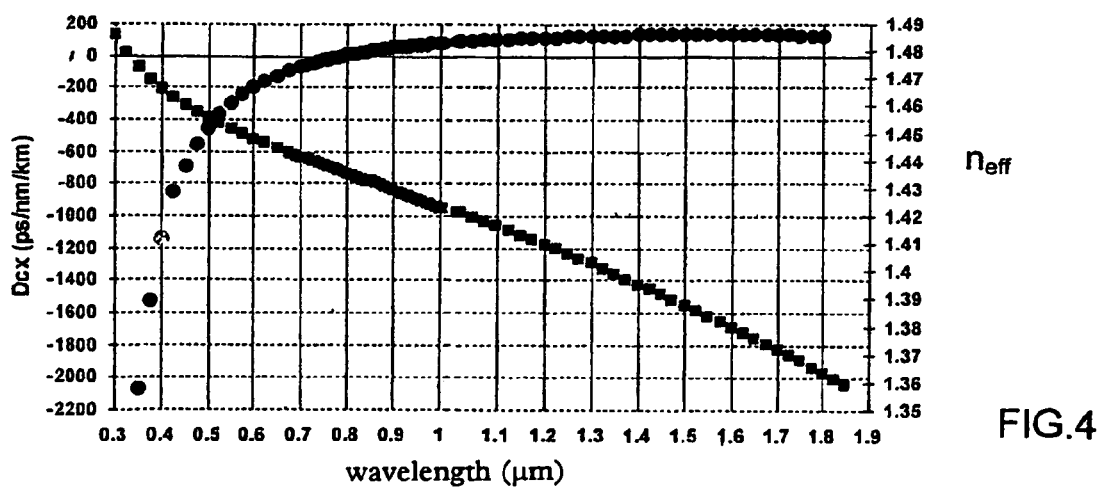
Figure 5:
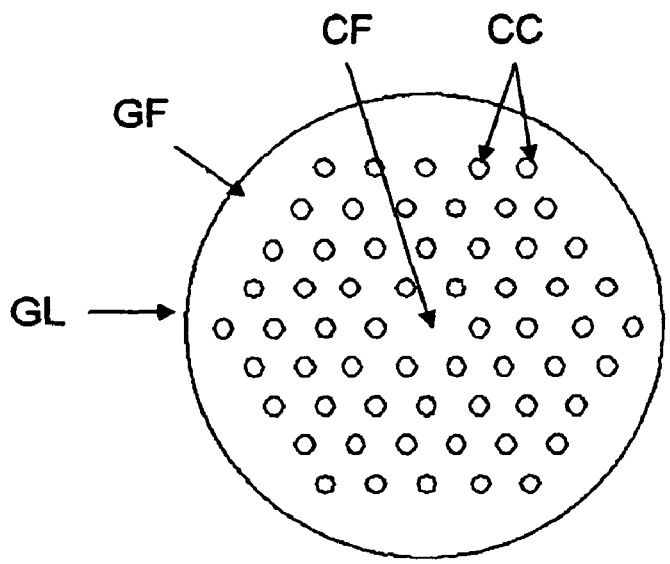
Figure 6:
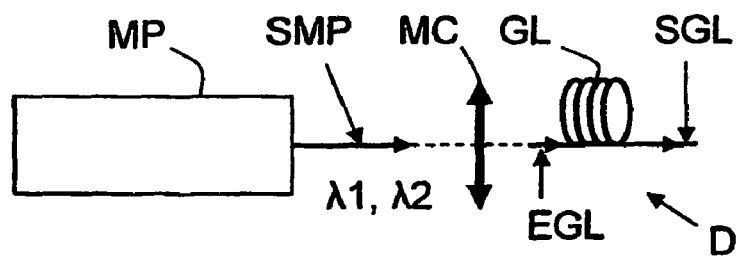
Figure 7:
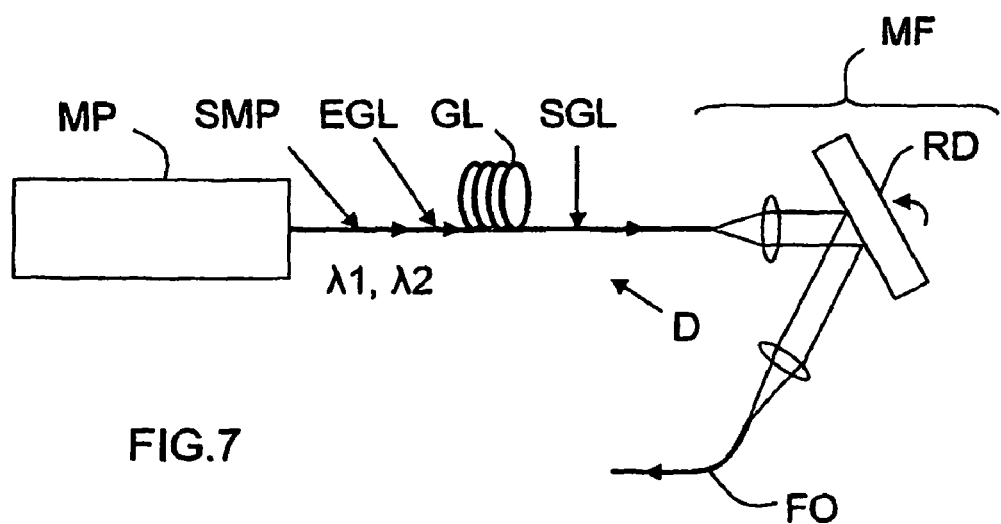

Further features and advantages of the invention will become apparent from a study of the detailed description that follows and the accompanying drawings, wherein:

FIG. 1 diagrammatically shows a first embodiment of a device for generating polychromatic light according to the invention, FIG. 2 diagrammatically shows an alternative embodiment of a pumping module, FIG. 3 is a diagram by way of example showing the intensity I (in arbitrary units) as a function of the wavelength λ (in nanometres (or nm)), on the one hand of the polychromatic light delivered by a device according to the invention and on the other hand of the light delivered by pumping by a monofrequency source, FIG. 4 is a diagram by way of example illustrating on the one hand the variation in dispersion Dcx of a fibre (in ps/nm/km) as a function of the wavelength in micrometres (increasing curve related to the y axis on the left, zero dispersion occurring at a wavelength equal to about 0.8 μm), and on the other hand the variation in the effective index neff of the fundamental mode of a fibre as a function of the wavelength in nanometres (decreasing curve related to the y axis on the right), FIG. 5 shows in highly diagrammatic form, in a cross-sectional view, a microstructured optical fibre, FIG. 6 shows in diagrammatic form a second embodiment of a device for generating polychromatic light according to the invention, FIG. 7 shows in schematic form a third embodiment of a device for generating polychromatic light according to the invention.

The accompanying drawings may not only supplement the invention but may also contribute to the definition thereof, if appropriate.

Reference will be made first of all to FIG. 1 to describe a first embodiment of a dedicated device D for generating polychromatic light according to the invention.

A device D according to the invention comprises first of all an optical pumping module MP used to deliver radiation having at least two different excitation wavelengths λ1 and λ2, and preferably two different sets of wavelengths. Of course, this optical pumping module MP could also deliver photons having more than two different wavelengths or more than two different sets of wavelengths, e.g. three or four or even more.

The optical pumping module MP of multiple wavelengths may be produced by a number of methods. For example it may take the form of a laser source consisting of a parametric oscillator. As shown in FIG. 2 it may also be in the form of a single wavelength laser source SL coupled to frequency conversion means such as a frequency doubler DF, for example. In this case, the laser source SL supplies the frequency doubler DF with photons (or radiation) having a first wavelength λ1, e.g. equal to 1064 nm, and the frequency doubler DF delivers at its output SMP photons (or radiation) at the first wavelength λ1 and photons (or radiation) at a second wavelength λ, equal to half of λ1, i.e. in this case 532 nm.

Moreover, the multi-wavelength optical pumping module MP may operate either in pulsed and time-synchronised mode or in a virtually continuous or continuous mode.

The device D according to the invention also comprises light-guiding means GL which are used to deliver at their output SGL a polychromatic light corresponding to a "continuum" when they are excited by radiation comprising several wavelengths, delivered by the optical pumping module MP, in a non-linear light/matter interaction regime.

"Polychromatic light" here means light with a spectrum of the kind shown in FIG. 3 (first curve between the wavelength 350 nm and 750 nm), i.e. substantially continuous and non-discretised, in terms of wavelength (λ), over a wide band. As can be seen from this diagram the intensity I (here in arbitrary units) of the polychromatic light which is delivered by the light-guiding means GL varies little over the range between about 420 nm and about 700 nm.

In a monomodal optical fibre using a negative dispersion regime (normal dispersion corresponding to a wavelength of less than 800 nm (or 0.8 μm) in FIG. 4), the pumping by a monofrequency source gives rise to discrete Raman lines towards the high wavelength (as shown in the second curve in FIG. 3 which is between wavelengths 500 nm and 700 nm). No signal (or only a very weak signal) can thus be generated at wavelengths which are shorter than the pumping signal. The number of Raman lines generated increases with the intensity of the signal injected.

In the case of pumping using at least two judiciously chosen wavelengths (or two sets of wavelengths, each having at least one wavelength), two modifications are thus observed in the spectral profile. As illustrated by the first curve in FIG. 3 (between wavelengths 350 nm and 750 μm), a homogeneous and symmetrical spectral broadening actually appears on either side of one of the pumping wavelengths, i.e. the Raman components are minimised. This double modification is chiefly due to a competitive phenomenon between the non-linear effects. The spectral broadening is explained by the combination of the effects of self-phase modulation, cross-phase modulation and parametric effects (a mixture of four waves). The addition of a second pumping power makes it possible to initiate phase tuning between the wavelengths centred around 532 nm and 1064 nm (in this example) and the positioning of the parametric effects which have an appearance threshold below that of the Raman effect.

Preferably, the light-guiding means GL have a dispersion profile which comprises one or more cut-offs associated with one or more selected wavelengths λc. In this case the element or elements constituting the optical pumping module MP is or are preferably chosen so as to deliver photons (or radiation) with excitation wavelengths above and below the selected wavelength λc. In the presence of more than two excitation wavelengths these are preferably distributed either side of the selected wavelength λc. Thus the spectrum of the polychromatic light is distributed substantially homogeneously and continuously on either side of the selected wavelength λc and hence on either side of the excitation wavelength λ1 and λ2.

The light-guiding means GL may be made in various ways. They may for example take the form of a light guide (or wave guide) of selected dimensions formed on a substrate. For example, the wave guide (or light guide) is made of a material such as doped glass so as to control the wavelength corresponding to the cut-off of the dispersion. The wave guide (or light guide) is preferably monomodal so that the polychromatic light is preferably transverse monomodal.

By "transverse monomodal" is meant here a particular spatial structure of the beam, characterised in that it has only one spatial mode, irrespective of the wavelength of the spectrum emitted in the particular instance.

Alternatively, and as shown in FIG. 1, the light-guiding means GL may be produced in the form of an optical fibre the non-linear properties of which are a function of its structure and dimensions. For example an optical fibre known as a microstructured optical fibre is used. This type of optical fibre has an adjustable "opto-geometric" structure which makes it possible to control the dispersion profile and allows propagation over the entire transmission band of silica and preferably in a transverse monomodal propagation mode. Furthermore, this type of optical fibre makes it possible to increase significantly the confinement of the guided electromagnetic field, thus reducing the appearance threshold of the non-linear phenomena which are responsible for spectral broadening.

For example, the optical fibre GL may be a perforated optical fibre of the type illustrated in FIG. 5, in transverse section. This type of optical fibre is described in detail particularly in European Patent No. 1148360. This microstructured fibre consists of hollow channels CC parallel to the longitudinal axis of the optical fibre GL, placed alongside one another around the core CF of the fibre, in a chosen pitch, so as to define a lattice structure (referred to as the photonic crystal), and formed in the material constituting the sheath GF which surrounds the silica core CF of the optical fibre GL. It will be remembered that a photonic crystal is a structure with a barred photon band consisting of diffracting elements (in this case hollow channels CC) defining a lattice (square or triangular, for example), the physical properties of which make it possible to control the propagation of light. Such a structure may be obtained for example by drawing in a wire-drawing die, as described in the publication by Jean-Michel Lourtioz, "les cristaux photoniques", p. 324, Editions Hermes, 2003. In the example shown in FIG. 5 the diameter of the core CF of the fibre GL measures about 3 μm and the pitch of the lattice is of the order of 3 to 4 μm.

The efficiency of conversion of the excitation photons into the photons of the continuum depends chiefly on the peak power delivered by the optical pumping module MP, the dimensions of the core CF of the optical fibre GL and the "active" length of said optical fibre GL. Thus an optical pumping module MP delivering high power (all the excitation wavelengths combined) makes it possible to use a shorter optical fibre (or wave guide).

For example, in the presence of two excitation wavelengths λ1 and λ2 of 1064 nm and 532 nm, respectively, it is possible to use a microstructured silica optical fibre GL having a core 3 μm in diameter and several metres long.

The spectral broadening corresponding to the generation of broad spectrum polychromatic light takes place here in a single passage through the microstructured optical fibre GL. However, several passages could also be carried out. It is important to note that the spectral broadening is substantially independent of the sign of the chromatic dispersion of the optical fibre GL (or wave guide), thus making it possible to reduce the constraints on the optogeometric parameters of the light-guiding means GL.

When the polychromatic light has to be polarised the light-guiding means GL may optionally be of the "polarisation selecting" or "polarisation maintaining" type.

The coupling between the output SMP of the optical pumping module MP and the input EGL of the light-guiding means GL may be made either directly, as in the example shown in FIG. 1, or indirectly, as in the second embodiment shown in FIG. 6.

Direct coupling may be envisaged, in particular, when the excitation photons (or radiation) are delivered by the optical pumping module MP at an output SMP consisting of light-guiding means, such as for example a light (or wave) guide or an optical fibre portion.

In the case of indirect coupling, the device D according to the invention comprises coupling means MC which may be made, for example, in the form of a lens interposed between the output SMP of the optical pumping module MP and the input EGL of the light-guiding means GL (see FIG. 6).

Furthermore, the device D according to the invention as described hereinbefore is adapted to deliver continuous polychromatic light over a broad spectrum, visible and/or ultraviolet and/or infrared. However, it is possible to envisage it being coupled to (or comprising) filtering means MF so as to filter (or select) the photons of the continuum, generated in the light-guiding means GL, in order to deliver photons (or radiation) in selected wavelengths or selected portions of the continuous spectrum. This makes it possible to synthesise a tailor-made light source.

All kinds of filtering means MF may be envisaged. However, they are advantageously integrated in the light-guiding means GL, for example in the form of one or more Bragg gratings (placed in series) which are well-known to those skilled in the art. In fact, a Bragg grating may be defined in a terminal part coupled to the output SGL of the light-guiding means GL or in a terminal part of this output SGL, for example by local index modulation according to a selected pitch and length, as diagrammatically shown in FIG. 1. In this case, by judiciously choosing the structure of the Bragg grating or gratings, it is possible to synthesise a source which emits one or more selected wavelengths.

As a variant, the use of one or more Fabry-Perot cavities (placed in series) may be envisaged.

However, the filtering means MF may be outside the light-guiding means GL and constitute an added-on component. In this case they may, for example, be coupled to the output SGL of the light-guiding means GL as shown in FIG. 7, and comprise a diffraction grating RD illuminated as a parallel beam and used to diffract the light in order to deliver a monochromatic beam to another light guide FO, such as for example an optical fibre FO, used to carry out spatial filtering for spectral selection. This arrangement, which is technologically simpler than a Bragg grating, makes it possible to produce a source which can be continuously tuned in wavelengths in the emission range of the polychromatic light source. Wavelength tuning is thus obtained by rotating the diffraction grating RD.

The invention may be used in numerous fields, particularly by virtue of the transverse coherence and the polychromatic nature of the light produced.

A first field is the metrology of physical magnitudes. The device D according to the invention may constitute the source of white light in an optical microstratigraphy device, for example of the type described in French Patent 2738343. In this device, white light is transported by an optical fibre to a microscope objective which focuses it on a sample (or object). The microscope objective has a selected chromatism so as to focus all the wavelengths contained in the white light in a Z-coordinate. Detection takes place in confocal mode with chromatic coding of the measuring axis. The spectrometer can be used to analyse the spectrum of the light reflected by the sample and to deduce some of its characteristics, such as, for example, its position relative to the detector and the optical thicknesses of the layers which make it up.

The accuracy of the measurements taken depends on the stability over time of the source of white light and the photometric balance, which depends primarily on the energy luminance (or power emitted per unit of surface and per unit of solid angle) of the source. Such characteristics are provided by the source according to the invention. By way of example, the above-mentioned device may incorporate a device according to the invention delivering a beam having the following characteristics, for example: core diameter 6 μm, power 3 mW, numerical aperture equal to 0.4 and mean luminance (between 400 nm and 700 nm) equal to 200 $W.mm^{-2}.sr^{-1}$. Compared with the sources currently used (quartz lamp or xenon arc) the light source according to the invention is a thousand times more powerful, thus making it possible to reduce by a factor of a thousand the integration time for an identical signal to noise ratio. A time gain of this kind is particularly useful in applications connected with quality control in the manufacture of products such as plastic films or glass or plastic packaging.

A second domain is optical microscopy and particularly the tomographic imaging of biological or non biological materials. For example, the device D according to the invention may constitute the source of white light of a device for optical tomography of the skin in vivo, of the kind described in French Patent 2738140. This device constitutes a confocal microscope with longitudinal chromatic coding using a multichannel analytical spectrophotometer. Such a device requires a source of white light which has sufficient brightness to allow images to be taken in a video sequence in a biological medium. The source according to the invention is therefore particularly well suited to this type of device. It is even more so when the optical tomography is of the so-called coherent kind, as in the case of the OCT technique for "optical coherence tomography", which requires a broadband source with low temporal coherence. This OCT technique is used particularly for high resolution biopsies. In this OCT application the spectral width of the source according to the invention does away with the need for the simultaneous use of several sources centred on different wavelengths.

A third domain is three-dimensional microscopy, particularly in applications such as the profilometry of surfaces or the examination of biological cells (e.g. blood cells).

A fourth domain combines analysis by phase contrast and strioscopy, which require a light source having great spatial coherence to illuminate a phase object with parallel light. In both applications an image of a light source is formed in the focal plane of an imaging device. This image is stopped (strioscopy) or phase shifted (phase contrast) relative to the light diffracted by the object under observation. The image of the object resulting from the diffraction is observed in the conjugated plane. This type of application requires a light source which is a point of light and very bright, both of which are characteristics of the sources according to the invention. These analyses are used particularly in optical microscopy in the field of biology, for example for studying low-refraction cells, and in metrology, e.g. for measuring microscopic surface rugosity in precision optical equipment. Mention may be made in particular of measuring techniques using structured light projection and Shack-Hartmann wave front analysers operating with white light for which laser granularity noise (or the "speckle" effect) can be eliminated. Thus the invention constitutes a major advantage compared with a monochromatic laser.

A fifth domain is interferometry, notably so-called low coherence interferometry. In fact it is possible to use a source according to the invention to monitor very high precision optical equipment such as that used in photolithography in the ultraviolet, as described in particular in the publication by A. Courteville, "Méthodes et techniques nouvelles pour l'industrie", conference of the SFO at Belfort on 17-21 Nov. 2003. It is also possible to use a source according to the invention in fibre-optic interferometers of the type described in US Patent 2002/085208, or in the field of biological and/or chemical sensors of the type described in the publication "Optical biosensors. Monitoring studies of glycopeptide antibiotic fermentation using white light interference", Analytical Chemistry, vol. 73, No 17, Sep. 1, 2001.

A sixth field is the monitoring or observation of buildings or monuments. It has been proposed, for example in the publication by F. Figuera et al, "Evaluation of white light Fabry-Perot interferometry fiber-optic gages for small strains", Experimental Techniques, p. 31-36, July/August 2003, to couple a source of white light to a Fabry-Perot cavity to form a strain gauge intended in particular for monitoring civil engineering structures. This type of application requires a highly reliable system for measuring strains, which depends principally on the life of the sources of white light of the different sensors (sometimes a hundred of them mounted in parallel). As the incandescent lamps currently used have a much shorter life than the sources according to the invention, particularly when laser sources are used, the invention is particularly well suited to this type of application. Generally speaking, the source according to the invention makes it possible to comply with numerous requirements in terms of spectrum and energy which are imposed by sensor gratings multiplexed with optical fibres coupled to Bragg gratings, as described in the publication by A. Othonos, "Fiber bragg gratings: Fundamentals and applications in telecommunications and sensing", Artech House Optoelectronics Library, Hardcover, June 1999.

A seventh field is LIDAR observation (standing for "Light Detection and Ranging"). A LIDAR measuring device has been proposed, notably in U.S. Pat. No. 5,394,243, for measuring wind speed at low altitudes (typically between 10 m and 100 m). Such a device comprises a broad spectrum light source filtered at the emission stage and at the reception stage by a Fabry-Perot interferometer. The spectroscopy of the light diffused by the atmosphere makes it possible to determine the Doppler effect and from this to deduce a speed vector, particularly when the beam of light is subject to a conical sweep. The source according to the invention is therefore particularly well suited to this type of application as it allows focussing from a long distance, it provides high power over a wide range of wavelengths and substantially less noise than the partition noise produced by the multimodal laser diodes currently used. More generally, the invention is particularly well adapted to the spectroscopy of solids, liquids and gases. In particular, the invention makes it possible to envisage an atmospheric LIDAR-type application for detecting and titrating gaseous species, and application of the multipass measuring cell type which is described in particular in the publication "Two-mirror multipass absorption cell", Applied Optics, vol. 20, No 6, 15 Mar. 1981.

An eighth field is the spectroscopy of microscopic objects, which requires the focussing of excitatory light into a very small point. As the source according to the invention is able to emit in the ultraviolet, the visible and the infrared and is easy to focus, it is therefore particularly well suited to the spectroscopic analysis of microscopic objects such as natural chromophores of cells. It is therefore possible to study the optical properties of erythrocytes at the cellular or sub-cellular level. Moreover, the high power provided by the source according to the invention also allows it to be used in the field of flux microspectroscopy, particularly for studying the coloration phenomena obtained in the diffraction diagrams described in the publication by Kerker, "The scattering of light and other electromagnetic radiation", p. 396, 1969.

A ninth field is the transmission of images, possible holographic images, using optical fibres. This data transmission is carried out using a spectral modulation technique which requires substantially constant spectral distribution of light over a wide range of wavelengths and at high power so as to compensate the losses intrinsic in optical transmission fibres. By reason of its characteristics the source according to the invention is therefore particularly well suited to this application.

Numerous other applications may also be envisaged, particularly in the field of white light holography and so-called Lippmann photography, or in the field of the manipulation of atoms or molecules (for example in order to cover one or more optical absorption lines of an atomic edifice, as described in the document "Atom cooling by white light", Applied Physics B54, p. 428-433, 1992).

The invention is not limited to the embodiments of a white light generating device described above, solely by way of example, but encompasses all the variants which may be envisaged by the skilled man within the scope of the claims that follow.

The invention claimed is:
1. A device for generating a polychromatic light, comprising:
    optical pumping means including a laser source with a frequency converter for delivering radiation at first and second excitation wavelengths $\lambda 1$ and $\lambda 2$, respectively, having the frequencies 1064 and 532 nanometers, respectively; and
    a microstructured optical fiber exhibiting a dispersion profile having a cancellation wavelength between the first and second excitation wavelengths at about 800 nanometers, and designed, in the event of excitation by the radiation in a non-linear excitation mode, to deliver an output of a polychromatic light,
    wherein the dispersion profile of said microstructured optical fiber remains at a same sign between said cancellation wavelength and about 1800 nanometers.

2. The device according to claim 1, wherein the microstructured optical fiber is of monomode type, so as to deliver the output of the microstructured optical fiber a transverse monomode polychromatic light.

3. The device according to claim 1, wherein the optical pumping means is designed to deliver the radiation in a pulsed and temporally synchronized manner.

4. The device according to claim 1, wherein said optical pumping means is designed to deliver the radiation in a continuous or quasi-continuous manner.

5. The device according to claim 1, wherein the frequency converter is configured to operate as a frequency doubler operable to deliver the radiation with the second excitation wavelength $\lambda 2$ having half the first excitation wavelength $\lambda 1$.

6. The device according to claim 1, wherein said microstructured optical fiber is chosen from at least one of a holey fiber and a photonic fiber.

7. The device according to claim 1, wherein said microstructured optical fiber is of a polarization selection type.

8. The device according to claim 1, wherein said microstructured optical fiber is of a polarization maintaining type.

9. The device according to claim 1, further comprising:
filtering means configured to filter at least some of the wavelengths of the radiation downstream of said microstructured optical fiber.

10. The device according to claim 9, wherein the filtering means comprise at least one Bragg grating.

11. The device according to claim 1, further comprising:
coupling means configured to couple said optical pumping means to an input of the microstructured optical fiber.

12. A method of generating a polychromatic light, comprising the steps of:
optical pumping by a laser source with a frequency converter for delivering radiation at first and second excitation wavelengths $\lambda 1$ and $\lambda 2$, respectively, having wavelengths of 1064 and 532 nanometers, respectively;
cancelling a wavelength at about 800 nanometers between the first and second excitation wavelengths by a microstructured optical fiber exhibiting a dispersion profile; and
delivering an output of a polychromatic light at the microstructured optical fiber, in the event of excitation by the radiation in a non-linear excitation mode, wherein
the dispersion profile of said microstructured optical fiber remains at a same sign between said cancellation wavelength and about 1800 nanometers.

13. The method according to claim 12, wherein said step of delivering further comprises:
delivering on the output of the microstructured optical fiber a transverse monomode polychromatic light, wherein
the microstructured optical fiber is of monomode type.

14. The method according to claim 12, wherein said step of optical pumping further comprises:
delivering the radiation in a pulsed and temporally synchronized manner.

15. The method according to claim 12, wherein said step of optical pumping further comprises:
delivering the radiation in a continuous or quasi-continuous manner.

16. The method according to claim 12, further comprising a step of:
doubling the frequency for delivering the radiation with the second excitation wavelength $\lambda 2$ having half the first excitation wavelength $\lambda 1$ by using the frequency converter as a frequency doubler.

17. The method according to claim 12, further comprising a step of:
filtering at least some of the wavelengths of the radiation downstream of said microstructured optical fiber by a Bragg grating.

18. The method according to claim 12, further comprising a step of:
coupling said optical pumping means to an input of the microstructured optical fiber.

* * * * *